(12) United States Patent
Regonini et al.

(10) Patent No.: US 7,882,932 B2
(45) Date of Patent: Feb. 8, 2011

(54) HELICOPTER TRANSMISSION

(75) Inventors: Roberto Regonini, Somma Lombardo (IT); Giuseppe Gasparini, Gallarate (IT); Giampaolo Solda', Oleggio (IT)

(73) Assignee: Agusta S.p.A, Samarate (IT)

( * ) Notice: Subject to any disclaimer, the term of this patent is extended or adjusted under 35 U.S.C. 154(b) by 883 days.

(21) Appl. No.: 11/450,876

(22) Filed: Jun. 12, 2006

(65) Prior Publication Data
US 2009/0072081 A1   Mar. 19, 2009

(30) Foreign Application Priority Data
Jun. 30, 2005   (EP) .................................. 05425470

(51) Int. Cl.
*F16H 57/04* (2010.01)
(52) U.S. Cl. .................. 184/6.12; 384/469; 384/902
(58) Field of Classification Search .................. 244/60; 184/6.12, 6.5; 384/469, 473, 902; B64D 35/00
See application file for complete search history.

(56) References Cited

U.S. PATENT DOCUMENTS

| | | | | |
|---|---|---|---|---|
| 2,368,963 | A | * | 2/1945 | Boden ........................ 184/11.1 |
| 2,911,267 | A | * | 11/1959 | Small, Jr. ...................... 384/465 |
| 4,116,505 | A | * | 9/1978 | Stahlecker ................... 384/471 |
| 4,271,928 | A | * | 6/1981 | Northern ...................... 184/6.4 |
| 4,571,097 | A | * | 2/1986 | Lee et al. ..................... 384/469 |
| 4,858,427 | A | * | 8/1989 | Provenzano ................ 60/39.08 |
| 5,121,815 | A | | 6/1992 | Francois et al. |
| 7,651,049 | B2 | * | 1/2010 | Carnelli et al. ........... 244/17.11 |

FOREIGN PATENT DOCUMENTS

| | | |
|---|---|---|
| DE | 3730916 | 3/1989 |
| DE | 102 58 807 A1 | 7/2004 |
| DE | 10258807 A1 * | 7/2004 |
| FR | 2 685 758 | 7/1993 |
| GB | 1 349 012 A | 3/1974 |

OTHER PUBLICATIONS

Machine translation of specification for Hoffman (DE 102 58 807 Al) from ep.espacenet.com.*

* cited by examiner

*Primary Examiner*—David D Le
*Assistant Examiner*—Terry Chau
(74) *Attorney, Agent, or Firm*—Berenato & White, LLC

(57) ABSTRACT

There is described a transmission for a helicopter, the transmission having a movable transmission member; a casing housing the movable member; lubricated supporting means for supporting the movable member inside the casing and for rotation about an axis; and feed means for feeding a lubricating fluid to the supporting means; the transmission also has storage means permitting gradual release of the lubricating fluid, and which are connected fluidically to the feed means and to the supporting means to permit lubrication of the supporting means in the event of breakdown of the feed means; and the storage means are angularly integral with the movable member and located radially inwards of the supporting means to feed the lubricating fluid centrifugally to the supporting means.

6 Claims, 2 Drawing Sheets

HELICOPTER TRANSMISSION

The present invention relates to an improved helicopter transmission.

BACKGROUND OF THE INVENTION

As is known, helicopters are normally equipped with a number of transmissions for transmitting motion from one or more turbines to the main and/or tail rotor, and/or from the turbine to a number of accessory devices, i.e. for powering on-board equipment, for example.

The transmissions normally comprise one or more rotary members rotating about respective axes; a casing housing the rotary members; a number of bearings supporting the rotary members in rotary and axially-fixed manner inside the casing; and a feed device for supplying and lubricating the bearings with lubricating oil contained inside special tanks.

In the event of damage to the tank or breakdown of the feed device, the oil pressure falls, thus preventing operation of the transmission.

In the industry, a need is felt to ensure, in such cases, correct operation of the transmission for a predetermined length of time, e.g. thirty minutes, to allow the helicopter to land.

Moreover, for missions of a given duration, helicopter certification regulations require that the helicopter be able to maintain level flight for said predetermined length of time.

SUMMARY OF THE INVENTION

It is an object of the present invention to provide a helicopter transmission designed to meet the aforementioned requirements in a straightforward, low-cost manner.

According to the present invention, there is provided a helicopter transmission as claimed in the attached Claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
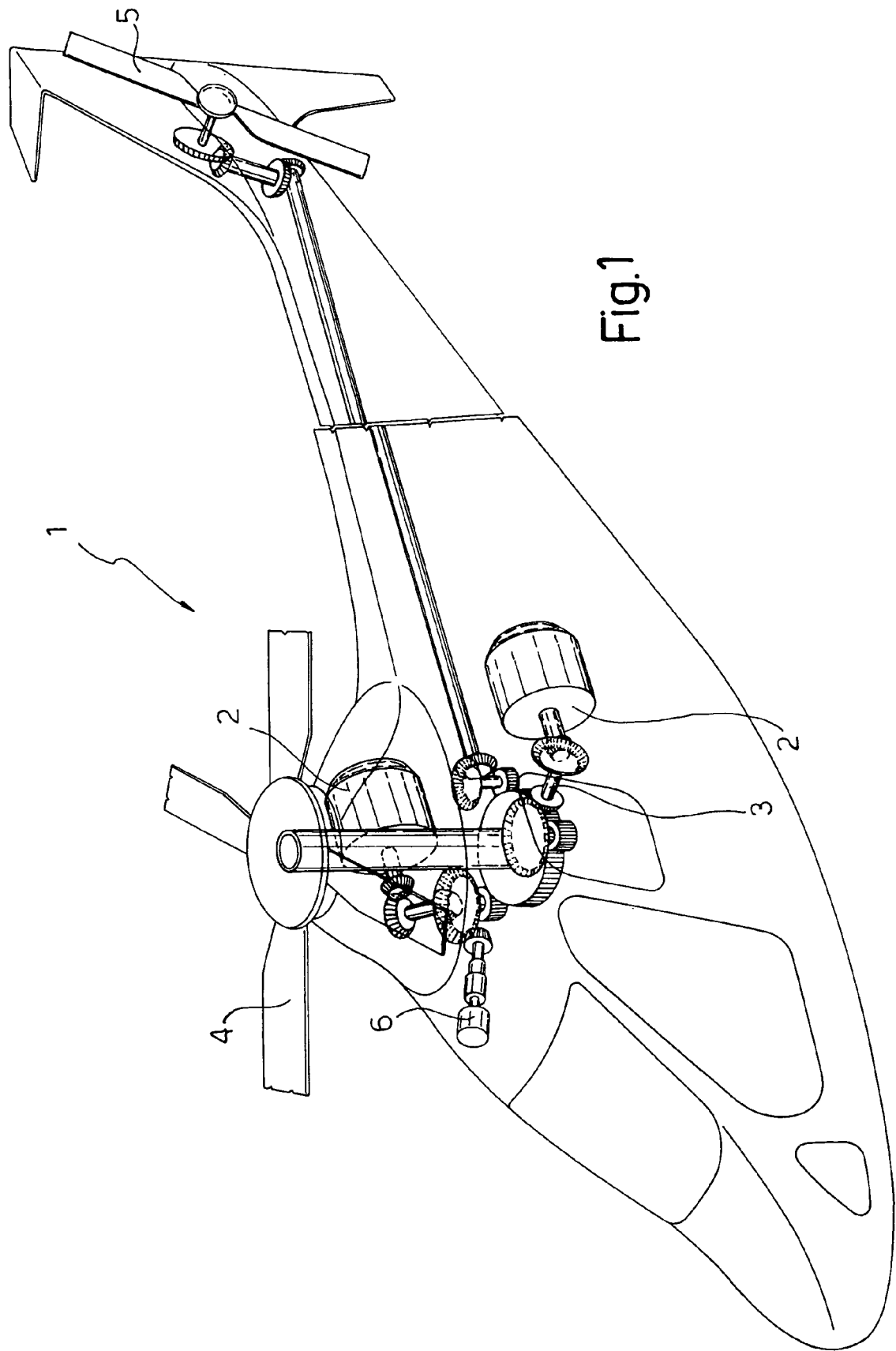
FIG. 1 shows a view in perspective of a helicopter comprising a transmission in accordance with the present invention.

Number 1 in FIG. 1 indicates a helicopter comprising two turbines 2; a main rotor 4; a tail rotor 5; and a primary transmission 3 (shown schematically) for transmitting motion from turbines 2 to main rotor 4 and tail rotor 5.

Helicopter 1 also comprises a number of secondary transmissions 6 for transmitting motion from primary transmission 3 to respective known accessory devices (not shown), i.e. for powering respective on-board equipment, for example.

For the sake of simplicity, and purely by way of example, the following description refers to only one transmission 6.

Figure 2:
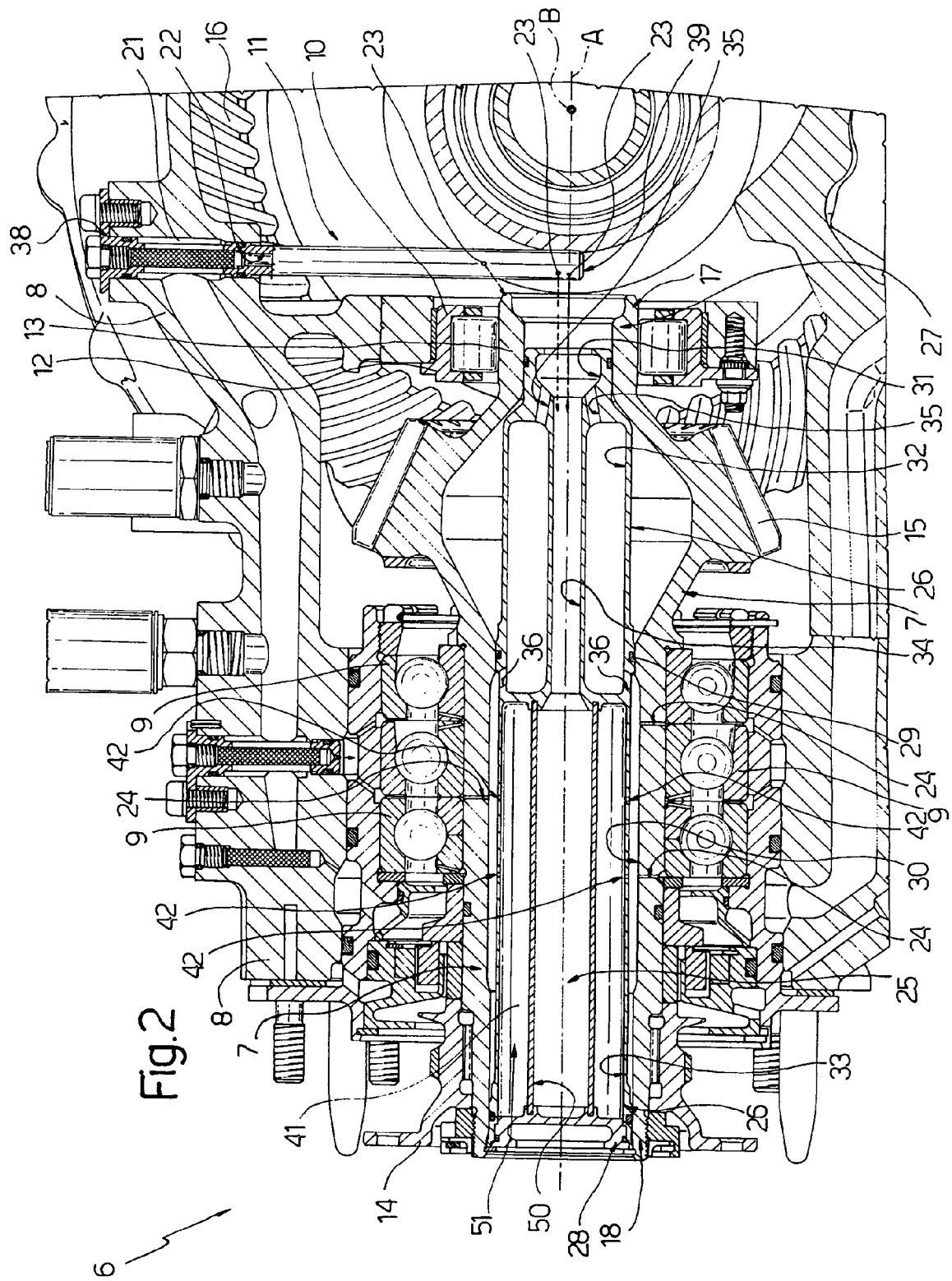
FIG. 2 shows a larger-scale axial section of the FIG. 1 transmission.

With reference to FIG. 2, transmission 6 comprises a transmission shaft 7 rotating about an axis A to transmit motion from primary transmission 3 to the respective accessory device; a casing 8 secured to a fixed structure of helicopter 1 and housing shaft 7 coaxially; a number of bearings 9, 10 interposed radially between shaft 7 and casing 8 to support shaft 7 in rotary, axially-fixed manner inside casing 8; and a feed device 11 for receiving oil from a known tank (not shown) and feeding it to, and for lubricating, bearings 9, 10.

More specifically, shaft 7 supports a flange 14 and a gear 15 connected functionally to primary transmission 3 and the accessory device respectively, and fixed to shaft 7 adjacent to respective opposite axial ends 18, 17 of shaft 7.

Flange 14 projects axially from casing 8 for easy connection to transmission 3.

Shaft 7 is axially hollow and open at opposite axial ends 17, 18.

Bearings 9, 10 are rolling bearings, and are located with respect to shaft 7 as follows: three bearings 9 are interposed axially between flange 14 and gear 15, and a fourth bearing 10 is interposed axially between end 17 of shaft 7 and gear 15.

More specifically, each bearing 9 comprises an inner race and an outer race fixed to the outer surface of shaft 7 and the circumferential surface of casing 8 respectively; and bearing 10 comprises a radially outer race defined by a ring 12 fixed to casing 8, and a radially inner race defined by a portion 13 of the outer circumferential surface of shaft 7 adjacent to end 17.

In normal operating conditions, feed device 11 feeds the oil to lubricate bearings 9 into shaft 7 through end 17, and the oil flows from shaft 7 to bearings 9 as described in detail below.

Feed device 11 also feeds the oil to lubricate bearing 10 onto portion 13 of shaft 7.

More specifically, feed device 11 comprises a tubular member 21 defining a coaxial conduit 22 connected fluidically to the tank; and a number of nozzles 23 supplied by conduit 22 and for ejecting oil from feed device 11 to lubricate bearings 9, 10.

More specifically, member 21 projects radially from casing 8 inside a cavity defined between casing 8 and shaft 7 at end 17, and comprises opposite radial ends 38, 39 fixed to casing 8 and facing end 17 of shaft 7 respectively.

Nozzles 23 are located adjacent to end 39. More specifically, in the example shown, two nozzles 23 eject oil into shaft 7 through end 17 to lubricate bearings 9; and one nozzle 23, further outwards radially with respect to axis A, ejects oil onto portion 13 of shaft 7 to lubricate bearing 10.

According to an important aspect of the present invention, transmission 6 also comprises a gradual-release oil storage device 25 connected fluidically to feed device 11 and bearings 9 to permit oil feed to bearings 9 in the event of breakdown of feed device 11 and/or damage to the tank. Storage device 25 is located radially inwards of bearings 9 with respect to axis A, to feed oil to bearings 9 centrifugally.

More specifically, storage device 25 is housed inside an axially hollow body 26 fitted coaxially inside shaft 7 and preferably made of aluminum.

In normal operating conditions, body 26 defines an oil flow path from feed device 11 to bearings 9 to permit lubrication of bearings 9, and an oil flow path from feed device 11 to storage device 25 to collect oil inside storage device 25. In the event of breakdown of feed device 11 and/or damage to the tank, body 26 also defines an oil flow path from storage device 25 to bearings 9 to still permit, albeit temporary, lubrication of bearings 9.

More specifically, body 26 is fixed in fluidtight manner inside shaft 7 at opposite axial ends 27, 28 close to ends 17, 18 of shaft 7 respectively, and at a section 29 perpendicular to axis A and interposed axially between ends 27, 28.

A radial clearance is therefore defined between the other portions of the body 26 and the shaft 7. More specifically, between the section 29 and the end 28, the body 26 and the shaft 7 define a radial gap, or first chamber, 30 for the purpose explained below.

More specifically, the body 26 and shaft 7 define the first chamber 30 bounded axially between the section 29 and the end 28.

The first chamber 30 is connected fluidically to the bearings 9 by a number of—in the example shown, three—conduits 24 formed radially through the shaft 7, and permits oil feed from the body 26 to the bearings 9.

Working from the end 27 to the end 28, the body 26 defines a succession of chambers:

a second chamber 31 open at opposite axial ends to receive oil from feed device 11 at end 27;

an annular fourth chamber 32 connected fluidically at opposite axial ends to gap 30 and chamber 31; and a third chamber 33 housing storage device 25.

More specifically, the third chamber 33, fluidically isolated from the fourth chamber 32 and closed axially at the end 28, is of an axial extension within the axial extension of the first chamber 30, and is connected to the second chamber 31 by a more radially inner conduit 34 extending coaxially through the fourth chamber 32.

In normal operating conditions, oil therefore flows from feed device 11 to storage device 25 along the flow path defined, in order of flow, by chamber 31, conduit 34, and chamber 33.

Chamber 32 is connected to chamber 31 by a number of spaced circumferential openings 35, each having a respective axis sloping with respect to axis A and converging towards end 27.

Chamber 32 is also connected to gap 30 by a number of spaced circumferential openings 36 interposed axially between section 29 and chamber 33, and each having a respective axis sloping with respect to axis A and converging towards end 27.

In normal operating conditions, oil therefore flows from feed device 11 to bearings 9 along the flow path defined, on order of flow, by chamber 31, openings 35, chamber 32, openings 36, gap 30, and conduits 24.

Storage device 25 is housed entirely inside chamber 33, and comprises a cylinder 50 coaxial with axis A and communicating with chamber 31 via conduit 34; and an annular member 41 cooperating radially, on one side, with cylinder 50, and, on the opposite side, with the inner surface of the portion of body 26 facing gap 30.

Cylinder 50 is fixed at opposite axial ends to body 26, is filled with oil, in normal operating conditions, by feed device 11 via conduit 34, and has a number of holes (not shown) crosswise to axis A to permit oil flow from the inside volume of cylinder 50 to member 41.

Member 41 is preferably made of porous sintered material to allow the lubricating oil through, and is connected to gap 30 by a number of radial holes 42 formed through body 26. In the event of breakdown of feed device 11 and/or damage to the tank, the holes in cylinder 50, together with the pores in member 41 and holes 42 in body 26, feed oil centrifugally from chamber 33 to gap 30 to permit lubrication of bearings 9.

The pores in member 41 are sized to resist centrifugal flow of the oil and so delay oil supply to bearings 9 in the event of breakdown of feed device 11 and/or damage to the tank.

In actual use, shaft 7 is supported in rotary and axially-fixed manner by bearings 9, 10, which must be oiled to function correctly.

In normal operating conditions, nozzles 23 of feed device 11 feed oil from the tank onto portion 13 of shaft 7 to lubricate bearing 10, and into chamber 31 of body 26 to lubricate bearings 9.

A major portion of the oil fed into chamber 31 lubricates bearings 9 directly, while a residual portion is collected in storage device 25.

More specifically, the major portion of the oil flows from chamber 31 through openings 35, chamber 32, and openings 36 into gap 30, and then from gap 30 through conduits 24 to bearings 9 to lubricate the bearings.

The residual portion of the oil, on the other hand, flows from chamber 31 along conduit 34 to member 41, where it accumulates, and from where, by virtue of centrifugal force and the porous material of member 41, it is directed centrifugally to holes 42.

In normal operating conditions, oil outflow from member 41 into gap 30 through holes 42 is prevented by the pressure of the oil already inside gap 30 and coming from chamber 32.

In the event of breakdown of feed device 11 and/or damage to the tank, no oil is fed by nozzles 23 into chamber 31, thus emptying chamber 32 and gap 30.

In which case, the oil collected in storage device 25 is released gradually to temporarily lubricate bearings 9.

That is, gap 30 being partly empty, the oil collected in member 41 is allowed to flow out through holes 42 into gap 30.

More specifically, oil flows gradually out of member 41 by virtue of the porosity of member 41.

The oil flow from member 41 into gap 30 through conduits 24 reaches bearings 9 to keep bearings 9 lubricated for a predetermined length of time, even in the event of breakdown of feed device 11 and/or damage to the tank.

In which case, helicopter 1 has a predetermined length of time, e.g. about thirty minutes, in which transmissions 6 continue to function until an appropriate landing site is located.

More specifically, helicopter 1 is able to maintain level flight for said predetermined length of time, thus conforming with certification requirements governing missions of predetermined duration.

Clearly, changes may be made to transmission 6 as described and illustrated herein without, however, departing from the protective scope defined in the accompanying Claims.

The invention claimed is:

1. A transmission (6) for a helicopter (1), the transmission (6) comprising:

at least one movable member (7);

a casing (8) housing said movable member (7);

a lubricated support (9) for supporting said movable member (7) inside said casing (8) and for rotation about an axis (A);

a feed device (11) for feeding a lubricating fluid to said support (9);

a storage device (25) permitting gradual release of said lubricating fluid, and is connected fluidically to said feed device (11) and to said support (9) to permit lubrication of said support (9) in the event of breakdown of said feed device (11);

said storage device (25) being angularly integral with said movable member (7) and located radially inwards of said support (9) to feed said lubricating fluid centrifugally to said support (9);

said storage device (25) being housed inside said movable member (7);

said storage device (25) comprising a cylinder (50) for collecting said lubricating fluid supplied by said feed device (11) in normal operating conditions and a member (41) having passages for said lubricating fluid, cooperating radially with said cylinder (50) and connected fluidically to said support (9);

a first chamber (30) through which said lubricating fluid flows in normal operating conditions and which is fed by said feed device (11), interposed radially between said member (41) with passages and said support (9), and in turn feeds the support (9);

said member (41) being connected fluidically to said support (9) by said first chamber (30);

a body (26) housed inside said movable member (7) and angularly integral with said movable member (7);

said body (26) comprising:

- a second chamber (31) distinct and spaced from said cylinder (50) and fed, in use, with said lubricant fluid by said feed device (11); and
- a third chamber (33) housing said storage device (25);

said second chamber (31) being fluidically connected to said first chamber (30) and to said cylinder (50);

said body (26) comprising a number of holes (42) which connect said member (41) with said first chamber (30);

said member (41) with passages comprising a portion made of porous material, the pores of which being sized to produce a predetermined resistance to the centrifugal flow of said lubricating fluid.

2. The transmission as claimed in claim 1, wherein said member (41) with passages is made of sintered material.

3. The transmission as claimed in claim 1, wherein said body (26) comprises a fourth chamber (32) fluidically connected at opposite axial ends to said first chamber (30) and to said second chamber (31).

4. The transmission as claimed in claim 3, wherein said body (26) comprises a conduit (34) extending coaxially through said fourth chamber (32) between said second chamber (31) and said cylinder (50); said conduit (34) being radially inner with respect to said fourth chamber (32).

5. The transmission as claimed in claim 3, wherein said body (26) comprises a number of first openings (35) interposed between said fourth chamber (32) and said second chamber (31), and a number of second openings (36) interposed between said first chamber (30) and said fourth chamber (32).

6. The transmission as claimed in claim 1, further comprising a nozzle (23) provided to eject said lubricant fluid to lubricate a further support (10).

\* \* \* \* \*